(12) United States Patent
Kim et al.

(10) Patent No.: US 7,097,337 B2
(45) Date of Patent: Aug. 29, 2006

(54) VERTICAL LIGHT EMITTING TYPE BACKLIGHT MODULE

(75) Inventors: Hyung Suk Kim, Kyungki-do (KR); Young Sam Park, Seoul (KR); Hun Joo Hahm, Kyungki-do (KR); Jung Kyu Park, Kyungki-do (KR); Young June Jeong, Kyungki-do (KR)

(73) Assignee: Samsung Electro-Mechanics Co., Ltd., Kyungki-Do (KR)

( * ) Notice: Subject to any disclaimer, the term of this patent is extended or adjusted under 35 U.S.C. 154(b) by 186 days.

(21) Appl. No.: 10/917,383

(22) Filed: Aug. 13, 2004

(65) Prior Publication Data

US 2005/0265042 A1    Dec. 1, 2005

(30) Foreign Application Priority Data

May 27, 2004    (KR)    ..................... 10-2004-0037764

(51) Int. Cl.
*F21V 8/00*    (2006.01)
(52) U.S. Cl. ..................... 362/555; 362/560; 362/231; 362/373
(58) Field of Classification Search ................ 362/555, 362/560, 231, 294, 249, 373, 612, 613, 800, 362/27, 30
See application file for complete search history.

(56) References Cited

U.S. PATENT DOCUMENTS

| | | | |
|---|---|---|---|
| 5,836,676 A * | 11/1998 | Ando et al. ................. 362/244 |
| 6,679,621 B1 | 1/2004 | West et al. .................. 362/327 |
| 6,713,956 B1 * | 3/2004 | Hsing Chen et al. ....... 313/512 |
| 6,969,188 B1 * | 11/2005 | Kuo ........................... 362/613 |
| 2005/0185418 A1 * | 8/2005 | Peng et al. ................. 362/555 |
| 2005/0254255 A1 * | 11/2005 | Hotelling .................... 362/554 |

* cited by examiner

*Primary Examiner*—Ali Alavi
*Assistant Examiner*—Peggy A. Neils
(74) *Attorney, Agent, or Firm*—Lowe Hauptman & Berner, LLP.

(57) ABSTRACT

Disclosed herein is a vertical light emitting type backlight module, for irradiating white light to the rear side of a liquid crystal display in the perpendicular direction. The vertical light emitting type backlight module comprises a) one or more LED array modules, each comprising a substrate having conductive patterns printed on upper and lower surfaces of the substrate, respectively, a plurality of LED devices mounted on the upper and lower surfaces of the substrate, respectively, for emitting light toward the front of respective surfaces of the substrate with the LED devices mounted thereon, and a plurality of lenses formed to surround the LED devices, respectively, for directing the light emitted from the LED devices in a direction perpendicular to the LED while being within a predetermined angle from an axis parallel to a plane of the backlight module, the substrate being mounted perpendicular to the plane of the backlight module such that the light emitted from the LED devices is emitted in a direction approximately parallel to the plane of the backlight module, and b) a reflection plate for each of the LED array modules for reflecting the light spread in the horizontal direction to change path of the light to the perpendicular direction.

12 Claims, 6 Drawing Sheets

VERTICAL LIGHT EMITTING TYPE BACKLIGHT MODULE

RELATED APPLICATIONS

The present application is based on, and claims priority from, Korean Application Number 2004-37764, filed May 27, 2004, the disclosure of which is hereby incorporated by reference herein in its entirety.

BACKGROUND OF THE INVENTION

1. Field of the Invention

The present invention relates to a vertical light emitting type backlight module, which provides an image by directly emitting light from the underneath of an LED (Light Emitting Diode) panel, and more particularly to a vertical light emitting type backlight module of a liquid crystal display, which has reduced change of path of light, thereby decreasing light loss, while having a simplified lens structure, thereby allowing easy manufacturing and design.

2. Description of the Related Art

As a current developing trend in the electronic equipment industry, LCDs (Liquid Crystal Display) have been spotlighted as next generation display devices. However, since LCDs do not emit light on their own, an LCD panel for communication is provided, at the rear side thereof, with a backlight for emitting light.

The backlight enables colors of an image realized by the LCD panel to be reproduced nearly into real colors by emitting white light from the rear side of the LCD panel. As for the light source of the backlight, in the early days of the backlight, a CCFL (Cold Cathode Fluorescent Lamp) or an EEFL (External Electrode Fluorescent Lamp) was used. However, with the advent of highly efficient LEDs (Light Emitting Diode) having excellent physical and chemical properties, it has been suggested to employ LEDs as the light source for the backlight.

As for the backlight module employing the LED, there are a direct illumination type backlight module, which emits the light directly under the LCD panel, and a side emitting type backlight module, which is formed, at one side of the backlight module, with the light source, so that the light path is changed to direct light to the front side thereof using a reflection plate or a light guide plate.

The LED is a semiconductor light emitting device, which emits various colors of light, with the light source being constituted by compound semiconductors of various materials, such as GaAs, AlGaAs, GaN, InGaN and AlGaInP. As a standard for determining characteristics of the LED, colors, brightness, intensity of light, and the like, are used, and these are determined primarily by the compound semiconductor material used for the LED, and secondarily by the structure of the package for mounting LED chips. Accordingly, the package may have various structures according to requirements for applications of the LED.

FIG. 1 is a cross-sectional view illustrating an LED device suggested as a light source for a conventional side emitting type LCD backlight module. The LED device 10 comprises a lead line 12 for inputting or outputting an electrical signal, a package 11 made of a plastic material and being provided with a thermally conductive material therein, an LED chip 14 mounted in the package 11, and a lens 13 coupled to the package 11 on the top surface of the package 11 for changing the path of light generated from the LED chip 14 to the horizontal direction.

The lens 13 is optically designed such that respective light generated from the LED chip 14 and emitted in every direction may be refracted in the horizontal direction. Although the lens has a mortar-like shape in FIG. 1, there are problems in that, according to the emitting angle of the light generated from the LED chip 14, the lens may be more complicated, and in that the light deviated from ranges corresponding to an optical design thereof can be directed in the vertical direction without being refracted in the horizontal direction.

Additionally, when using the LED device 10 to realize the LCD backlight module, as shown in FIG. 2, the LED devices 10, each acting as a spot light source, are mounted in a line on a printed circuit substrate 21 having a predetermined length, thereby forming an LED array module 20 acting as a linear light source. Then, as shown in FIG. 3, after one or more LED array modules 20 are arranged in parallel and spaced predetermined distance apart, Each of the LED array modules 20 is provided, at either side of the LED array module 20, with a reflection plate 31 adapted to reflect the light emitted from the LED array module 20 in the horizontal direction to the vertical direction, thereby providing a backlight module 30.

As described above, with the backlight module 30 employing the conventional LED, the light initially generated by the LED chip 14 practically used as the light source is refracted in the horizontal direction by the lens 13, and is then reflected in the vertical direction by the reflection plate 31, whereby the path of the light is changed several times. As a result, there are several problems in that, firstly, the lens has a complicated structure in order to reflect the light generated by the LED chip 14 in the horizontal direction, thereby complicating the design and the manufacturing, in that, secondly, while initially generated light is forced to follow the path of the light changed several times, light loss can occur, in that, thirdly, when the light is refracted using the differences in refraction rates, since the light generated from the center of the LED device in a direction of an upper portion of the LED device is transmitted without having its direction changed, there can occur a hot spot at the center of the LED device, thereby requiring a shadow sheet for the backlight module 30 in order to prevent the hot spot from being generated.

SUMMARY OF THE INVENTION

The present invention has been made in view of the above problems, and it is an object of the present invention to provide a vertical light emitting type backlight module of a liquid crystal display, which has reduced change of path of light, thereby decreasing light loss, while having a simplified lens structure, thereby allowing easy manufacturing and design.

In accordance with one aspect of the present invention, the above and other objects can be accomplished by the provision of a vertical light emitting type backlight module, for radiating white light to the rear side of a liquid crystal display in the perpendicular direction, comprising: a) one or more LED array modules, each comprising: a substrate having conductive patterns printed on upper and lower surfaces of the substrate, respectively; a plurality of LED devices mounted on the upper and lower surfaces of the substrate, respectively, for emitting light toward the front of each of the surfaces of the substrate with the LED devices mounted thereon, and a plurality of lenses formed to surround the LED devices, respectively, for directing the light emitted from the LED devices in a direction perpendicular to the LED device while being within a predetermined angle from an axis parallel to a plane of the backlight module, the substrate being mounted perpendicular to the plane of the backlight module such that the light emitted from Each of the LED devices is emitted in a direction approximately parallel to the plane of the backlight module; and b) a reflection plate for Each of the LED array modules for reflecting the light spread in the horizontal direction to change path of the light to the perpendicular direction.

Further, the vertical light emitting type backlight module may further comprise a support for supporting the LED array modules such that the LED array modules may be located a predetermined height from the lowest reflection plane of the reflection plate.

Further, the vertical light emitting type backlight module may comprise two substrates coupled to each other such that the lower surfaces of the substrates face each other, each of the substrates having the conductive pattern printed on the upper surface thereof, and the substrate may consist of a metallic material having a high thermal conductivity.

Each of the lenses may have a semi-cylindrical shape such that the light generated from the LED devices may pass along the shortest path possible without total reflection, and Each of the LED devices may be located at the center of the lens. The plurality of lenses may be integrally connected to each other.

Each of the LED devices may comprise one or more white LED chips, and the LED device may comprise a plurality of red, blue and green LED chips combined in equal proportions in order to generate white light.

The support may be made of a metallic material having a high thermal conductivity to dissipate heat, generated from the LED array module, to the outside.

Each of the LED device may comprise a reflection plate having a wide reflection angle in a direction parallel to the plane of the backlight module and a narrow reflection angle in a direction perpendicular to the plane of the backlight module, such that the plurality of LED chips are located at the center of the reflection plate. The LED device may further comprise a base having a heat sink structure for dissipating the heat generated from the LED chips.

The reflection plate may have an elliptical shape having a major diameter parallel to the plane of the backlight module and a minor diameter perpendicular to the plane of the backlight module.

BRIEF DESCRIPTION OF THE DRAWINGS

The above and other objects, features and other advantages of the present invention will be more clearly understood from the following detailed description taken in conjunction with the accompanying drawings, in which.

DESCRIPTION OF THE PREFERRED EMBODIMENTS

Now preferred embodiments of the present invention will be described in detail with reference to the accompanying drawings so that those skilled in the art may easily understand and repeat the present invention.

Figure 4:
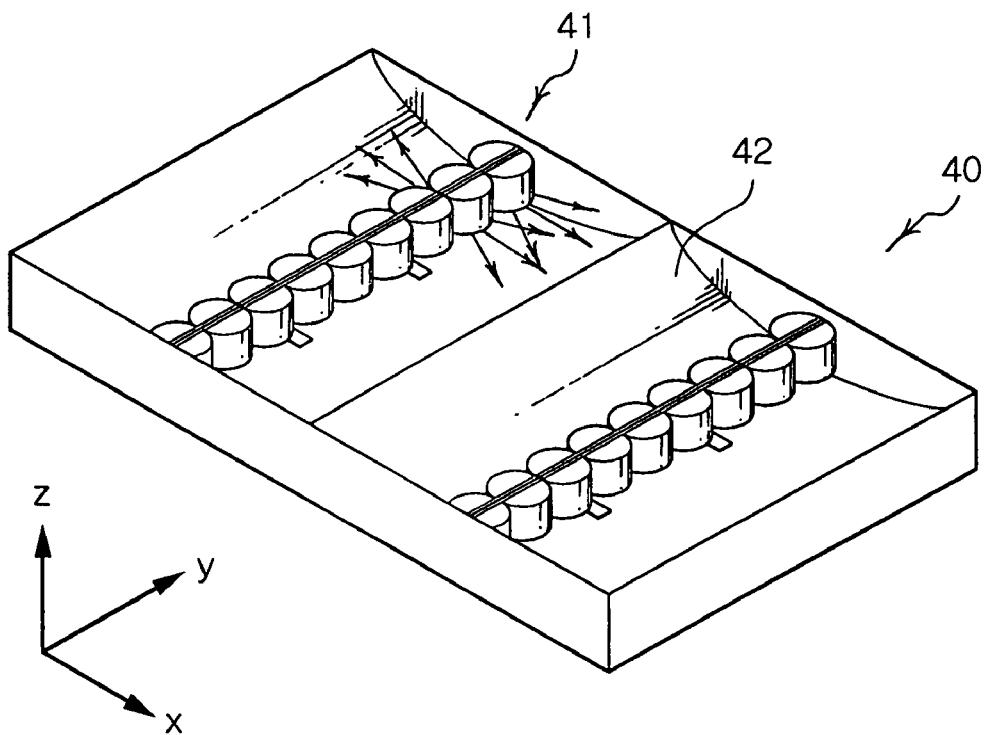
FIG. 4 is a perspective view showing a vertical light emitting type backlight module according to the present invention.

FIG. 4 is a perspective view showing a vertical light emitting type backlight module according to an embodiment of the present invention.

Figure 1:
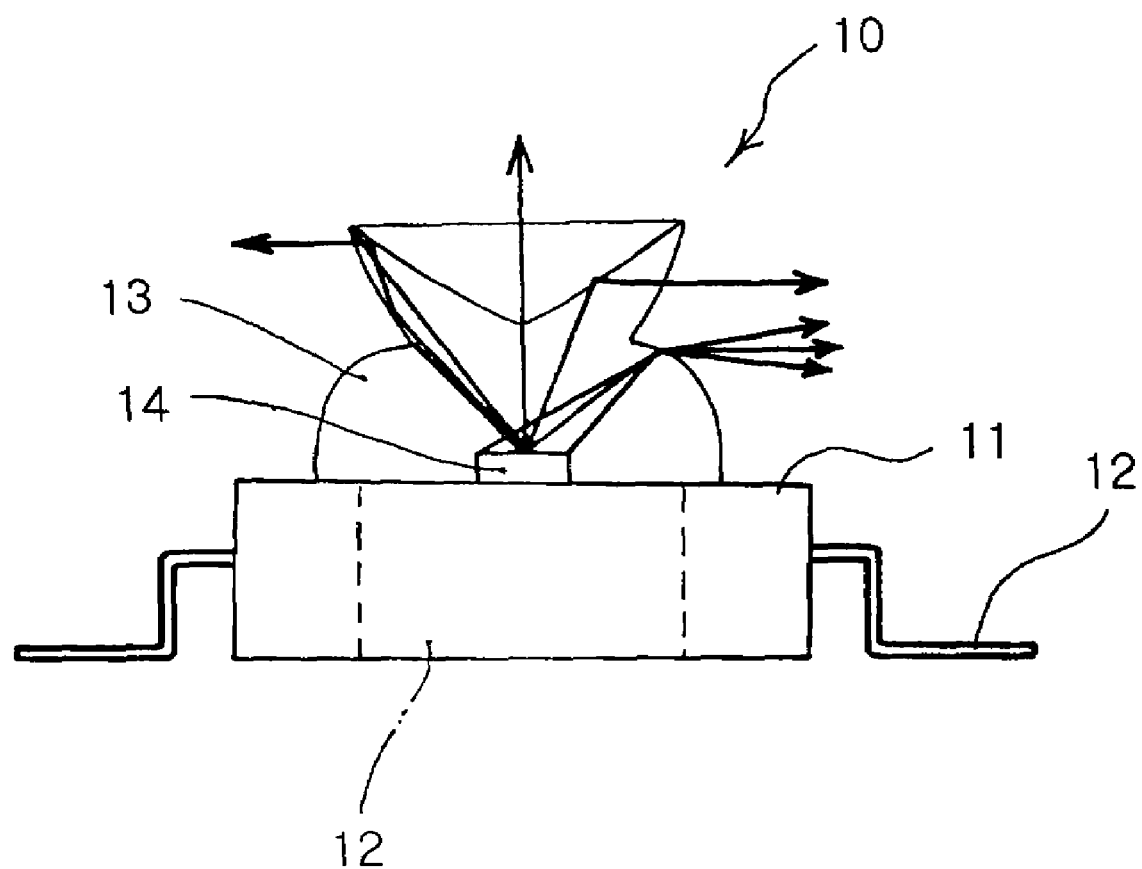
FIG. 1 is a cross-sectional view showing the structure of a conventional packaged LED device.
Figure 2:
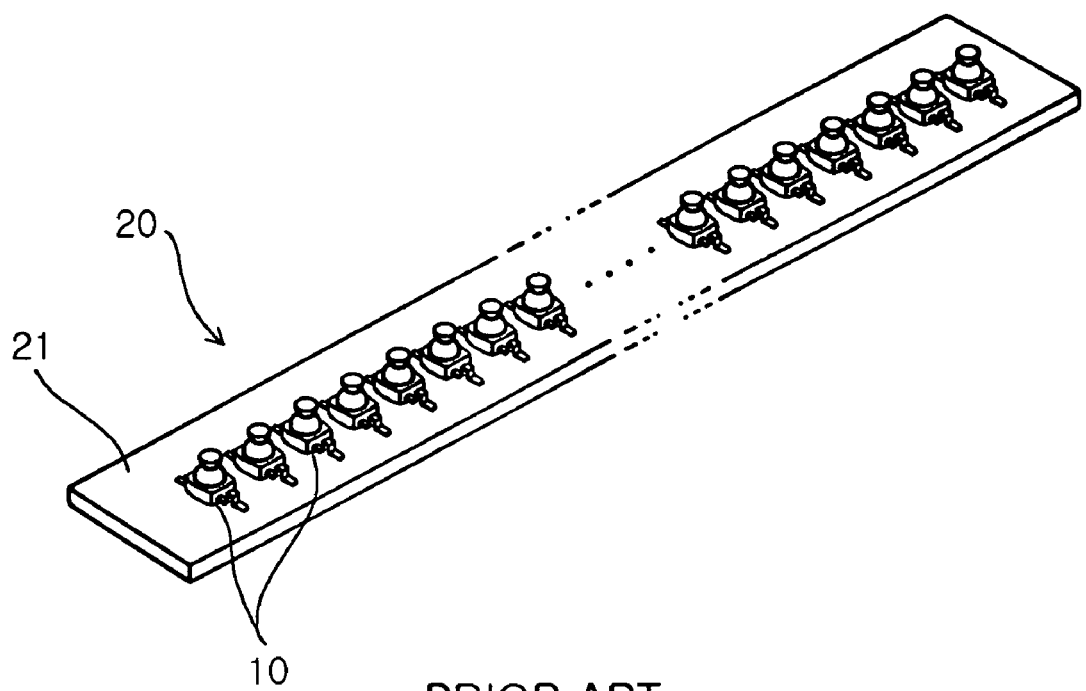
FIG. 2 is a perspective view showing an LED array module realized with the LED device of FIG. 1.
Figure 3:
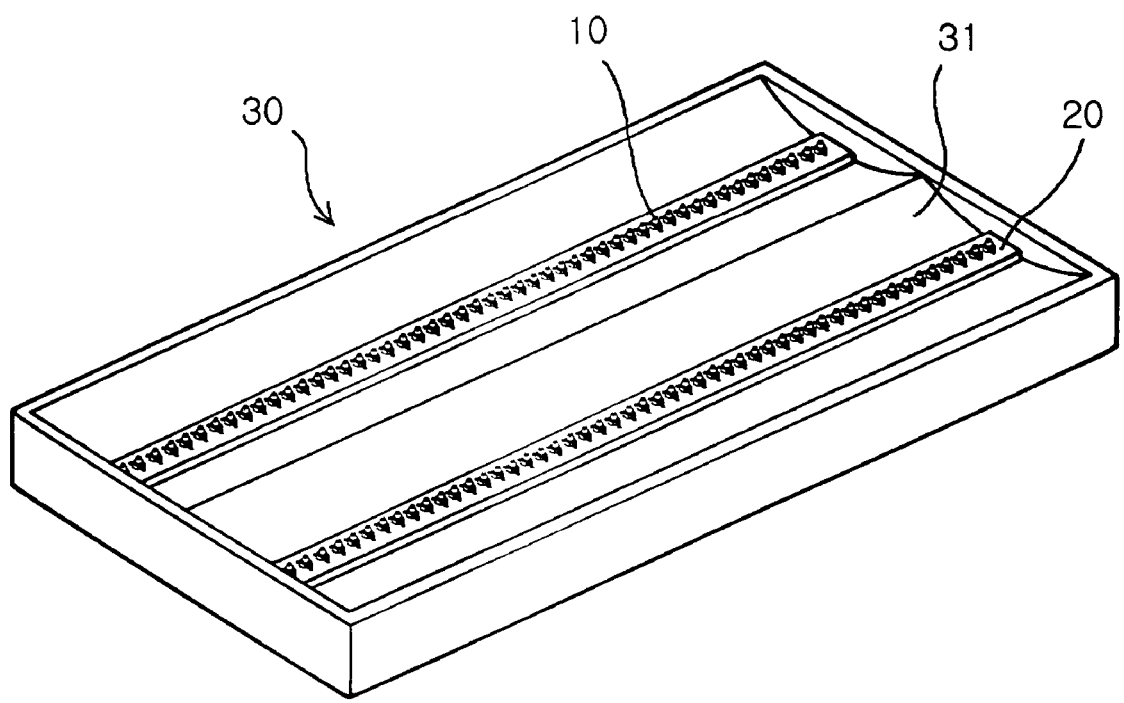
FIG. 3 is a perspective view showing a vertical light emitting type backlight module realized with the LED array module of FIG. 2.

Referring to FIG. 4, a vertical light emitting type backlight module 40 comprises one or more LED array modules 41, in which a plurality of LED chips are arranged in a line such that light generated from the LED chips is emitted in the horizontal direction, and a reflection plate 42 for reflecting the light emitted in the horizontal direction from the LED array module 41. The schematic shape of the vertical light emitting type backlight module 40 according to the present invention is similar to that of the conventional backlight module shown in FIG. 3.

However, according to the present invention, the LED array module 41 emits light in the horizontal direction, not by means of forcibly bending the light generated from the LED chips to the horizontal direction, but by means of arranging the LED chips such that the light generated from the LED chips is directed in the horizontal direction.

The structure of the LED array module 41 will be described in detail with reference to FIGS. 5, 6a and 6b.

Figure 5:
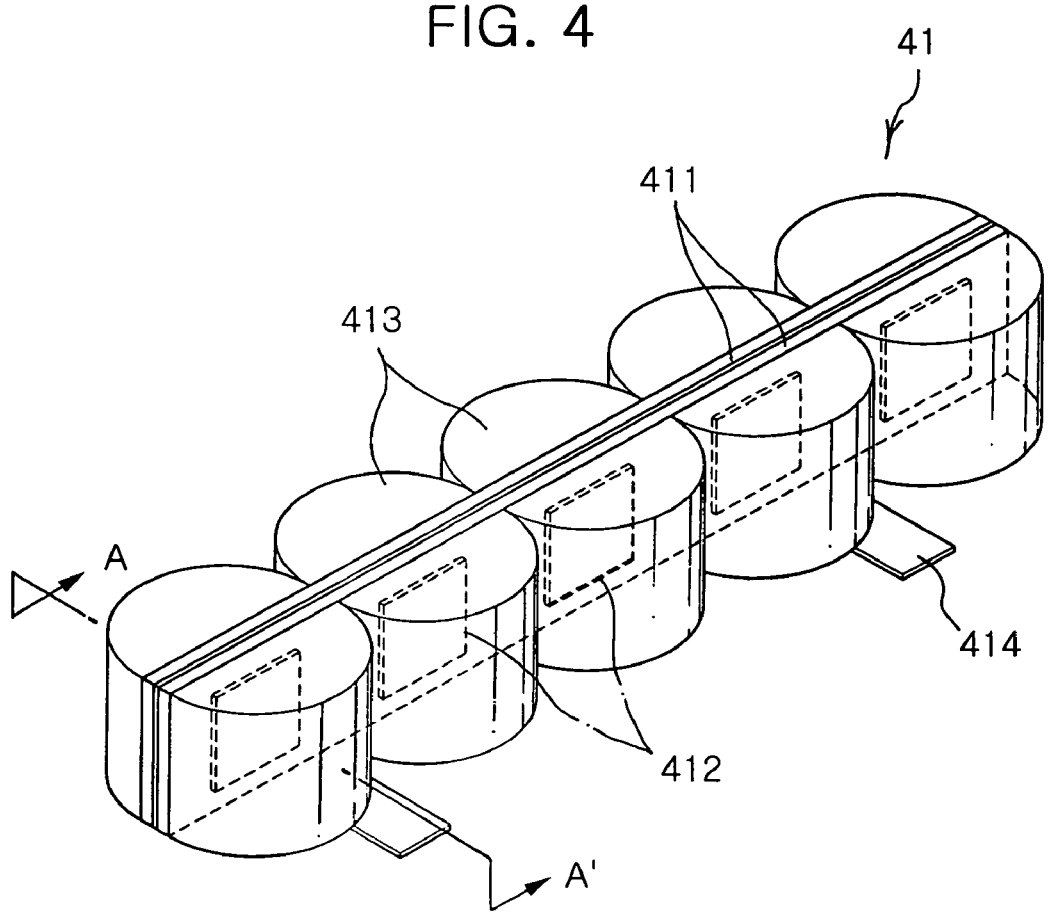
FIG. 5 is a perspective view showing an LED array module provided in the vertical light emitting type backlight module according to the present invention.
Figure 6A:
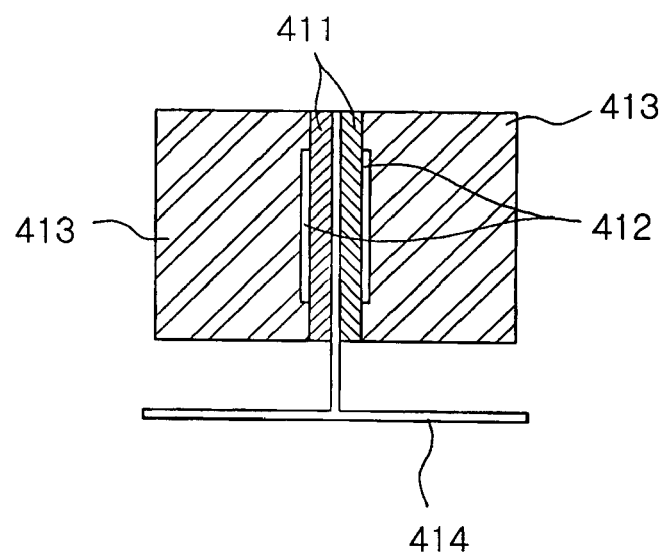
FIGS. 6a and 6b are a section side elevation showing the LED array module of FIG. 5, and a plain view showing the LED array module of FIG. 5, respectively.
Figure 6B:
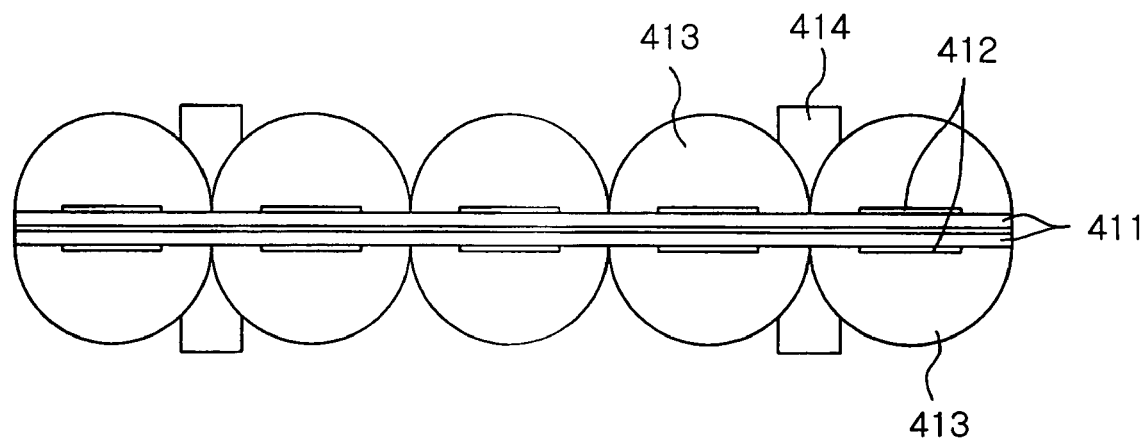
Figure 7A:
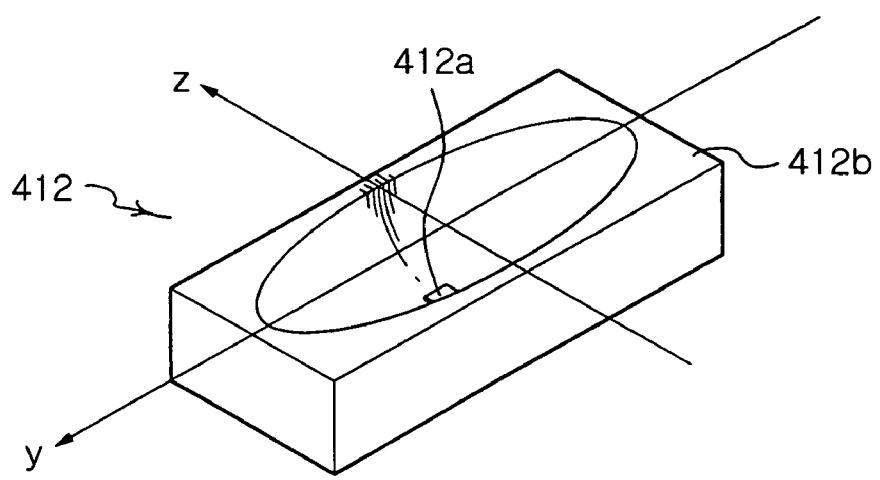
FIGS. 7a to 7d are diagrams showing the structure of an LED provided in the LED array module of FIG. 5.
Figure 7B:
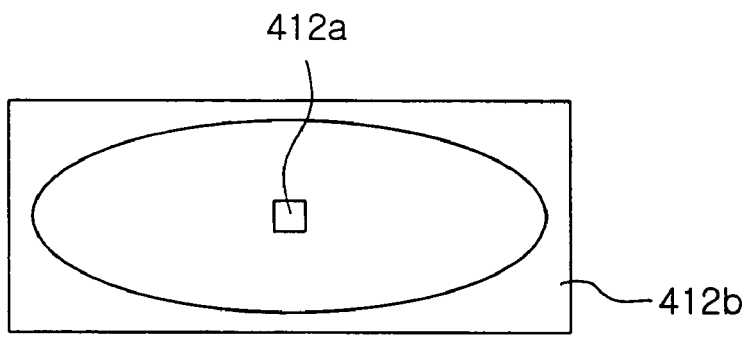
Figure 7C:
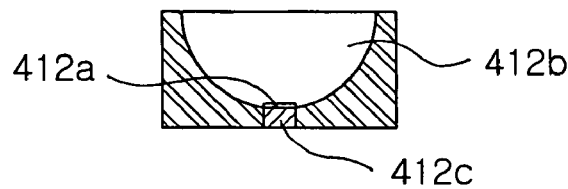
Figure 7D:
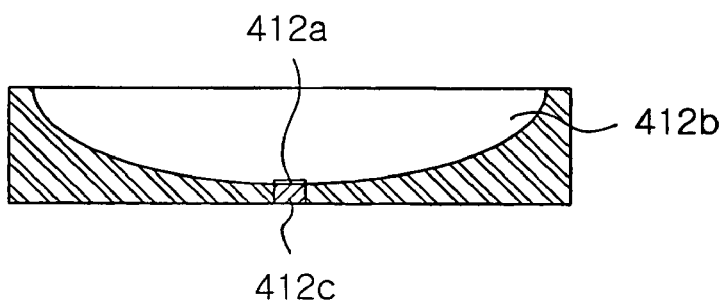

FIG. 5 is a perspective view showing an embodiment of the LED array module 41. FIGS. 6a and 6b are a section side elevation, and a plain view thereof, respectively. Referring to these drawings, the LED array module 41 comprises a substrate 411, whose plane is positioned upright, a plurality of LED devices 412 mounted on upper and lower surfaces of the substrate 411, in a line, at predetermined distances from each other, respectively, for emitting light in the horizontal direction from the upper and lower surfaces of the substrate 411, and a plurality of lenses 413 integrally formed to surround the plurality of LED devices 412 on either surface of the substrate 411 for spreading the light emitted from the LED devices 412 in the horizontal direction. The substrate 411 is fixed in the lenses 413.

Further, the LED array module 411 may further comprise a support 414 for fixing the substrate 411 in the perpendicular direction while supporting the substrate 411 such that the substrate 411 may be located a predetermined height from the reflection plate 42. Accordingly, the support 414 allows the LED array module 14 to be located the predetermined height from the reflection plate 42, thereby further enlarging an impact range of the light emitted from the LED array module 41.

Here, the LED array module 41 may comprise two substrates, each having the conductive pattern for transmitting an electrical signal printed on the upper surface of the substrate, in order to emit the light in both lateral directions.

The substrates are provided such that the lower surfaces of the two substrates face each other. That is, when using the two substrates, the plurality of LED chips can be mounted on respective upper surfaces of the substrates 411, which are positioned upright in the lenses.

The substrate 411 consists of a metallic material having a high thermal conductivity in order to prevent overheating of the LED devices 412 by dissipating heat generated during operation of the LED devices 412 to the outside. As for the metallic material, aluminum is generally used. Further, when the support 414 is made of a material having a high thermal conductivity, the heat generated from the LED devices 412 is dissipated to the outside by guiding the heat to the underneath of the backlight module 41.

Moreover, instead of mounting a separate lens for forcibly bending the path of light generated from the LED chips, each of the LED devices 412 is mounted on the substrate 411 so as to be vertically located along with the substrate 411 in the LED array module, so that the majority of the light is emitted in the horizontal direction.

The lenses 413 adapted to surround the plurality of LED devices 412 are provided not for forcibly changing the path of the light emitted from the LED devices 412, but for widely spreading the light emitted from the LED devices 412. Particularly, the lenses 413 are adapted such that the light can be emitted to the outside along the shortest possible path without generating total reflection, in order to prevent the light emitted from each of the LED devices 412 from being lost, which is caused by extension of the internal path of the light due to the total reflection or the like. For this purpose, each of the lenses 413 has a semi-cylindrical shape, at the center of which the LED device 412 is located.

The lens 413 is formed of translucent or semi-translucent resin.

Next, in order to enhance horizontal emitting of the light, each of the LED devices 412 may be adapted such that the light is spread widely in the horizontal direction while being spread narrowly in the perpendicular direction.

FIGS. 7a to 7d are a perspective view, a plain view, a cross-sectional view of a short side, and a cross-sectional view of a long side of the embodiment of the LED device 412.

Referring to FIGS. 7a to 7d, each of the LED devices 412 comprises one or more LED chips 412a, and a reflection plate 412b designed to have a wide reflection angle in the horizontal direction while having a narrow reflection angle in the perpendicular direction, whereby the light generated from the LED chips 412a is reflected in the horizontal direction. Moreover, the LED device 412 may further comprise a heat sink means 412c for transmitting the heat generated by the LED chip 412a to the substrate 411. The heat sink means 412c may consist of a highly thermally conductive material or may have a highly thermally conductive structure.

All of the one or more LED chips 412a may be realized as white LED chips for generating white light, otherwise, the LED chips 412a may be realized as a plurality of red, blue and green LED chips combined in equal proportions in order to generate white light.

In the case where the LED chips 412a are realized as the white LED chip, the white light generated by the LED chips is emitted through the reflection plate 412a and the lens 413, and its path is changed to the perpendicular direction at the reflection plate 42 of the backlight module 40. On the contrary, in the case where the LED chips 412a are realized as the plurality of red, blue and green LED chips, the red, blue and green light generated from the respective LED chips are mixed and then changed into white light when colliding with the internal reflection plate 412b, the lens 413, and the external reflection plate 42.

Figure 8:
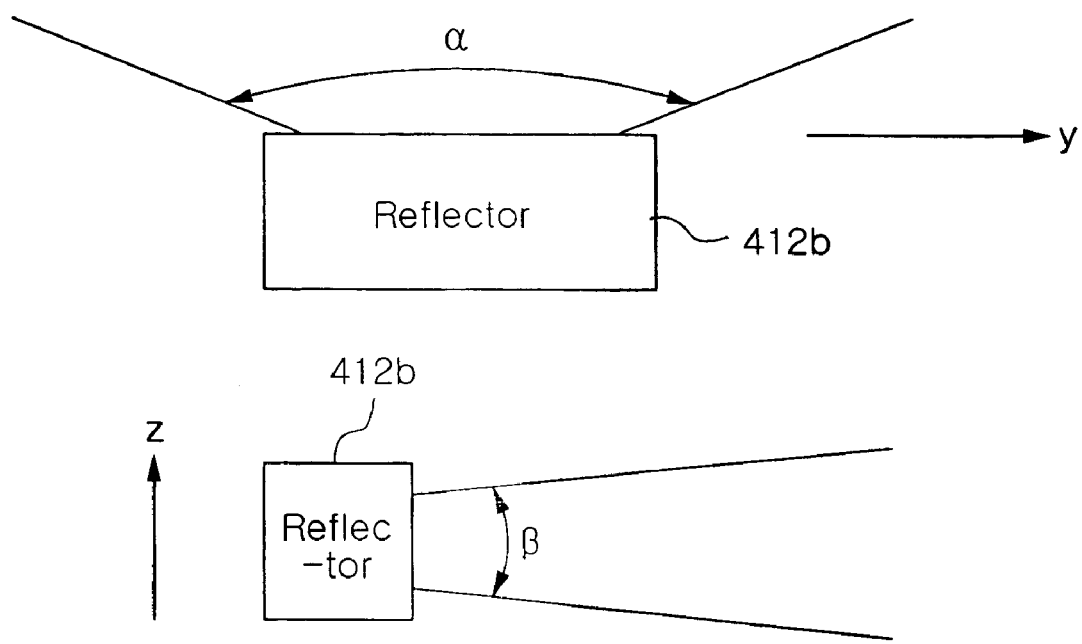
FIG. 8 is a representation depicting light emitting characteristics of the LED device.

As shown in FIG. 8, the reflection plate 412b has a wide horizontal emitting angle α and a narrow perpendicular emitting angle β. Accordingly, the light generated from the LED chips 412a is converged in the perpendicular direction while diverging in the horizontal direction. As a result, the light emitted directly in the perpendicular direction from the backlight module 40 can be prevented.

Therefore, the vertical light emitting type backlight module 40 shown in FIG. 4 may realize vertical light emitting characteristics by emitting light generated from the respective LED chips 412a in the horizontal direction without forcibly changing the path of the light, thereby allowing one reflection in the perpendicular direction at the reflection plate 42. That is, until the light initially generated from the LED chips 412a is emitted in the perpendicular direction to the outside, the path of the light can be formed as short as possible, thereby reducing light loss.

Here, arrangement of the LED array modules 41 is not limited to the shape shown in FIG. 4. For instance, the LED array modules 41 having a unit length are provided, and then may be arranged in a matrix. Although, according to the respective arrangements, the reflection plate 42 may have different shapes, operation of the reflection plate having different shapes is identical.

Moreover, the LED array module 41 may be realized by arranging packaged devices at predetermined distances on the substrate after integrally packaging the LED devices and lenses.

Figure 9:
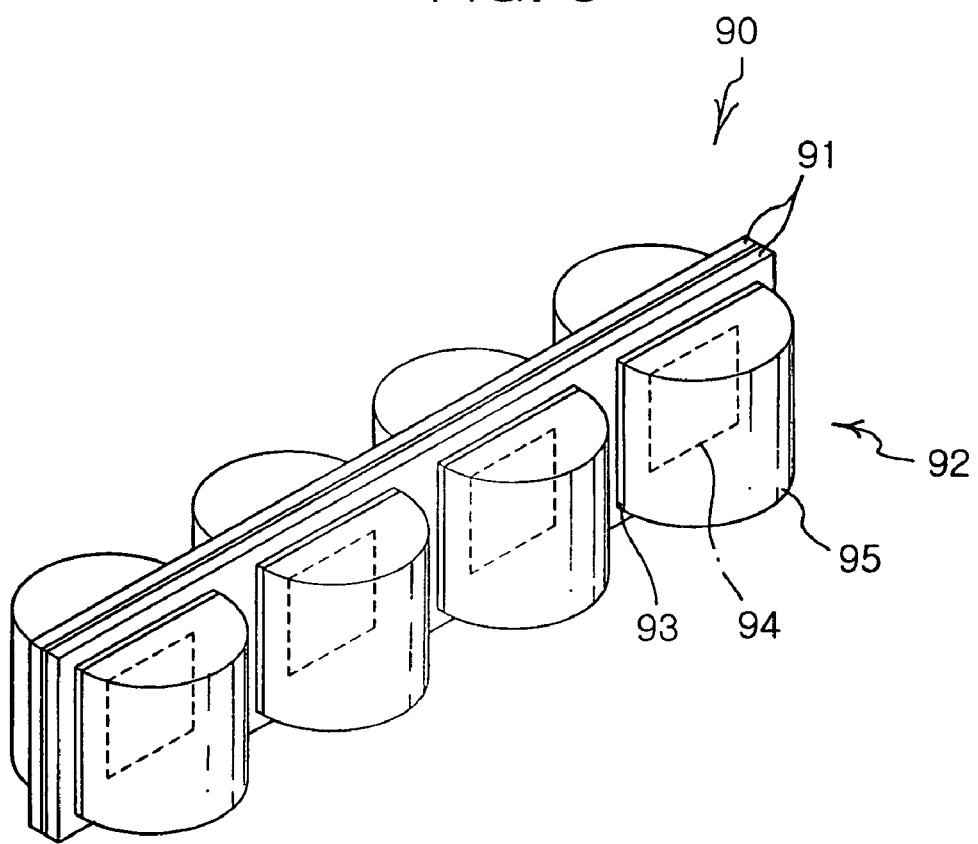
FIG. 9 is a perspective view showing another embodiment of an LED array module provided in the vertical light emitting backlight module of the present invention.

FIG. 9 is a perspective view showing a modification of the LED array module as described above. Referring to FIG. 9, an LED array module 90 comprises a plurality of LED devices 92, each of which integrally packages an LED chip 95 for generating light and a lens 95 for spreading the light generated from the LED chip 95 in the horizontal direction, and a substrate 91 for mounting the plurality of LED devices 92 in a line on both surfaces thereof.

As such in the embodiment as previously described, the substrate 91 may consist of a metallic material having a high thermal conductivity in order to enhance heat dissipation efficiency. Moreover, the LED array module 90 may comprise two substrates, each having the conductive pattern on the upper surface of the substrate, such that the lower surfaces thereof face each other. Then, the plurality of LED devices 92 are mounted on the substrate 91 on both upper sides thereof in a line at predetermined distances.

Although not shown in the figure, the LED array module 90 may further comprise a support means for supporting the LED array module 90 such that the LED array module 90 is spaced from the lowest plane of the reflection plate 42. Here, the support means may be made of the metallic material having a high thermal conductivity, thereby enhancing heat dissipation efficiency.

Specifically, each of the LED deices 92 is integrally formed with a base 93, a reflection plate 94 formed on the base and having a wide reflection angle in the horizontal direction while having a narrow reflection angle in the perpendicular direction, one or more LED chips, each being located at the center of the reflection plate 94, and the lens 96 adapted to surround the reflection plate 94 and the LED chips 95 on the base 93 in order to emit the light along the shortest path of the light to the outside.

The reflection plate 94 has the same shape as that shown in FIG. 7, and guides the light such that the light generated from the LED chips 95 is emitted widely in the horizontal direction while being emitted narrowly in the perpendicular direction. Likewise, the lens 96 has the semi-cylindrical shape such that the light can be emitted along the shortest path to the outside.

Like the LED array module shown in FIG. 4, the LED array modules 90 shown in FIG. 9 may be arranged in parallel, or the LED array modules 90 having a unit length may be arranged in a matrix.

As is apparent from the above description, the backlight module according to the present invention employs the LED chips as the light source, such that the light generated from the LED chips is emitted along the shortest path in the perpendicular direction, thereby reducing light loss. Further, the substrate is positioned upright in the LED array module such that the majority of the light emitted by the LED chips is directed in the horizontal direction, thereby making it unnecessary to provide a lens having a complicated structure for changing the path of light generated from the LED chips based on the principles of optics.

Accordingly, there are advantageous effects in that the backlight module according to the present invention is easy in design and manufacturing.

It should be understood that the embodiments and the accompanying drawings as described above have been described for illustrative purposes and the present invention is limited only by the following claims. Further, those skilled in the art will appreciate that various modifications, additions and substitutions are allowed without departing from the scope and spirit of the invention as set forth in the accompanying claims.

What is claimed is:

1. A vertical light emitting type backlight module, for radiating white light to the rear side of a liquid crystal display in the perpendicular direction, comprising:
    a) one or more LED array modules, each comprising: a substrate having conductive patterns printed on upper and lower surfaces of the substrate, respectively; a plurality of LED devices mounted on the upper and lower surfaces of the substrate, respectively, for emitting light toward the front of respective surfaces of the substrate with the LED devices mounted thereon; and a plurality of lenses formed to surround the LED devices, respectively, for directing the light emitted from the LED devices in a direction perpendicular to the LED device while being within a predetermined angle from an axis parallel to a plane of the backlight module, the substrate being mounted perpendicular to the plane of the backlight module such that the light emitted from the LED devices is emitted in a direction approximately parallel to the plane of the backlight module; and
    b) a reflection plate for each of the LED array modules for reflecting the light spread in the horizontal direction to change path of the light to the perpendicular direction.

2. The backlight module as set forth in claim 1, further comprising: a support for supporting each of the LED array modules such that the LED array modules may be located a predetermined height from the lowest plane of the reflection plate.

3. The backlight module as set forth in claim 1, wherein the backlight module comprises two substrates coupled to each other such that the lower surfaces of the substrates face each other, each of the substrates having the conductive pattern printed on the upper surface thereof.

4. The backlight module as set forth in claim 1, wherein the substrate consists of a metallic material having a high thermal conductivity.

5. The backlight module as set forth in claim 1, wherein each of the lenses has a semi-cylindrical shape such that the light generated from the LED devices may be emitted along the shortest path possible without total reflection, and each of the LED devices is located at the center of the lens.

6. The backlight module as set forth in claim 1, wherein the plurality of lenses are integrally connected to each other.

7. The backlight module as set forth in claim 1, wherein each of the LED devices comprises one or more white LED chips.

8. The backlight module as set forth in claim 1, wherein each of the LED devices comprises a plurality of red, blue and green LED chips combined in equal proportions in order to generate white light.

9. The backlight module as set forth in claim 2, wherein the support is made of a metallic material having a high thermal conductivity to dissipate heat, generated from the LED array module, to the outside.

10. The backlight module as set forth in claim 7, wherein each of the LED devices comprises the reflection plate having a wide reflection angle in a direction parallel to the plane of the backlight module and a narrow reflection angle in a direction perpendicular to the plane of the backlight module, such that the plurality of LED chips are located at the center of the reflection plate.

11. The backlight module as set forth in claim 7, wherein each of the LED devices further comprises a base having a heat sink structure for dissipating heat generated from the LED chips.

12. The backlight module as set forth in claim 10, wherein the reflection plate has an elliptical shape having a major diameter parallel to the plane of the backlight module and a minor diameter perpendicular to the plane of the backlight module.

* * * * *